United States Patent [19]

Shimamura et al.

[11] Patent Number: 5,221,128
[45] Date of Patent: Jun. 22, 1993

[54] ANTISKI BRAKE CONTROL SYSTEM

[75] Inventors: Morihiko Shimamura; Jiro Satoh; Takashi Kushiyama, all of Higashimatsuyama, Japan

[73] Assignee: Jidosha Kiki Co., Ltd., Tokyo, Japan

[21] Appl. No.: 938,589

[22] Filed: Sep. 3, 1992

Related U.S. Application Data

[63] Continuation of Ser. No. 600,568, Oct. 18, 1990, abandoned.

[30] Foreign Application Priority Data

Oct. 23, 1989 [JP] Japan .................. 1-276635

[51] Int. Cl.$^5$ .............................................. B60T 15/48
[52] U.S. Cl. .............................. 303/116.1; 303/113.5; 303/119.1; 303/900; 303/901
[58] Field of Search ............... 303/116.1, 116.2, 113.1, 303/113.5, 119.1, 900, 901, 9.62, 84.1

[56] References Cited

U.S. PATENT DOCUMENTS

| | | | |
|---|---|---|---|
| 4,778,222 | 10/1988 | Numata et al. | 303/116 R |
| 4,800,289 | 1/1989 | Adachi et al. | 303/116 R |
| 4,824,183 | 4/1989 | Uchida et al. | 303/DIG. 4 |
| 4,869,560 | 9/1981 | Nishii | 303/116 SP |
| 5,013,096 | 5/1991 | Ocvirk et al. | 303/116 R |

FOREIGN PATENT DOCUMENTS

| | | | |
|---|---|---|---|
| 0106759 | 4/1989 | Japan | 303/116 R |
| 2189855 | 4/1987 | United Kingdom | 303/DIG. 5 |
| 2197043 | 5/1988 | United Kingdom | 303/111 |

Primary Examiner—Matthew C. Graham
Attorney, Agent, or Firm—Varndell Legal Group

[57] ABSTRACT

An antiskid brake control system includes a supply passageway (16) bypassing a pressure-compensated flow control valve (13), and a check valve (22), which allows flow of brake fluid only toward a wheel cylinder, or a check valve (23), which allows flow of brake fluid only away from the wheel cylinder, is provided inside the supply passageway (16) and arranged in series with an orifice (15). Accordingly, antiskid brake control is such that either slow and fast pressurization modes, a fast depressurization mode and a holding mode or slow and fast depressurization modes, a fast pressurization mode and a holding mode are established. A sudden fluctuation in braking hydraulic pressure can be suppressed by establishing the holding mode when there is a transition from the fast depressurization mode to the fast pressurization mode or from the fast pressurization mode to the fast depressurization mode. Since this prevents a large fluctuation in the speed of adjustment, riding comfort is greatly improved during antiskid braking control and kickback developed by a brake pedal is suppressed, thereby improving driving feeling.

3 Claims, 4 Drawing Sheets

ANTISKI BRAKE CONTROL SYSTEM

This application is a continuation of Ser. No. 07,600,568, filed Oct. 18, 1990 now abandoned.

BACKGROUND OF THE INVENTION

1. Field of Invention

This invention relates to an antiskid brake control system in an automotive vehicle. More particularly, the invention relates to an antiskid brake control system provided with flow passage selector valves and pressure compensated flow control valves, in which the selector valves change over to a slow/fast depressurization mode to reduce brake hydraulic pressure and a slow/fast pressurization mode to raise brake hydraulic pressure at the time of antiskid braking control.

In general, antiskid brake control is adapted so that when it is detected during braking that the wheel of a vehicle is about to skid, the braking force acting upon the wheel is reduced to prevent skidding, after which the braking force is again enlarged. Such control stabilizes vehicle steering and makes the braking distance as short as possible.

2. Description of the Prior Art

One example of this antiskid brake control system for performing such a brake control operation is as shown in FIG. 5.

As illustrated in FIG. 5, this antiskid brake control system has a brake circuit formed into a diagonal piping configuration comprising a first brake system A and a second brake system B. The first brake system A is adapted so that the hydraulic pressure of a hydraulic-pressure source 1 including a pump 1a and an accumulator 1b is supplied to a wheel cylinder 3 for the right front wheel and a wheel cylinder 4 for the left rear wheel via a first control valve 2. The second brake system B is adapted so that the hydraulic pressure of the hydraulic-pressure source 1 is supplied to a wheel cylinder 6 for the left front wheel and a wheel cylinder 7 for the right rear wheel via a second control valve 5. Since the first and second brake systems A and B have the same construction, the first brake system A will be described and a description of the second brake system B will be omitted.

In the first brake system A, the first control valve 2 is constituted by a three-port, three-position valve. An output port 2a of the control valve 2 and the wheel cylinder 3 for the right front wheel are communicated via a first supply passageway 8, and the output port 2a of the first control valve 2 and the wheel cylinder 4 for the left rear wheel are communicated via a second supply passageway 9.

The first and second supply passageways 8, 9 are respectively provided with a first flow passage selector valve 10 and a second flow passage selector valve 11 each comprising a solenoid valve. The first and second flow passage selector valves 10, 11 are adapted to selectively change over the respective wheel cylinders 3, 4 to communication with the output port 2a of the first control valve 2 or with a reservoir tank 12. In the usual state shown in FIG. 5, the first and second pas sage selector valves 10, 11 are set to communicate the wheel cylinders 3, 4 with the output port 2a and to cut off the wheel cylinders 3, 4 from the reservoir tank 12.

The first and second supply passageways 8, 9 are further provided, at positions upstream of the first and second flow passage selector valves 10, 11, with respective first and second pressure-compensated flow control valves 13, 14, each comprising a mechanical valve, for selectively communicating and cutting off the output port 2a and the wheel cylinders 3, 4. The first and second pressure-compensated flow control valves 13, 14 are adapted to open the first and second supply passageways 8, 9 under the ordinary conditions shown in FIG. 5, and to change over and cut off the first and second supply passageways 8, 9 when a predetermined pressure differential develops between the pressure on the side of output port 2a and the pressures acting upon the wheel cylinders 3, 4.

The output port 2a is equipped with a first orifice 15 for communicating it with the wheel cylinder 3 via a third supply passageway 16 through the first flow passage selector valve 10, which bypasses tee first pressure-compensated flow control valve 13, and with a second orifice 17 for communicating it with the wheel cylinder 4 via a fourth supply passageway 18 through the second flow passage selector valve 11, which bypasses the second pressure-compensated flow control valve 14.

The second supply passageway 9 is provided with a proportioning valve PV 19 at a point between the second flow passage selector valve 11 and the wheel cylinder 4.

The reservoir tank 12 is connected to the suction side of the pump 1a, whose discharge side is in communication with the accumulator 1b and an input port 2b of the first control valve 2. The first and second control valves 2, 5 are connected to a brake pedal 21 via an equalizer 20. When the brake is inoperative, which is the state shown in FIG. 5, the first and second control valves 2, 5 are set at a first position to communicate the output port 2a with a discharge port 2c. By stepping down on the brake pedal 21, the valves 2, 5 are set at a second position where the three ports 2a, 2b, 2c are cut off from one another. By stepping down on the brake pedal 21 further, the valves 2, 5 are set at a third position where the output port 2a and input port 2b are communicated.

Depending upon the operating states of the first flow passage selector valve 10 and first pressure-compensated flow control valve 13, the antiskid brake control system is set to the control modes shown in Table 1.

TABLE 1

| ANTISKID BRAKE CONTROL MODES | | | |
|---|---|---|---|
| | | FLOW PASSAGE SELECTOR VALUE 10 | |
| | | ON | OFF |
| PRESSURE-COMPENSATED FLOW CONTROL VALVE 13 | ON | SLOW DEPRESSURIZATION | SLOW PRESSURIZATION |
| | OFF | FAST DEPRESSURIZATION | FAST PRESSURIZATION |

The operation of this antiskid brake control system will now be described.

Ordinarily, the valves 10, 11, 13 and 14 are in the states shown in FIG. 5, and the output port 2a is in communication with the wheel cylinders 3, 4. Accordingly, when the brake pedal 21 is depressed to set the first control valve 2 at the third position at the time of braking, the hydraulic pressure of the hydraulic-pressure source 1 is introduced to the wheel cylinder 3 for the right front wheel and the wheel cylinder 4 for the left rear wheel via the first and second supply passageways 8, 9, thereby applying braking to the right front wheel and the left rear wheel.

When it is detected that the right front wheel is about to skid, the solenoid of the first pressure-compensated flow control valve 13 is energized in response to the resulting detection signal. The first pressure-compensated flow control valve 13 therefore shuts the first supply passageway 8. Consequently, the brake fluid is supplied to the wheel cylinder 3 for the right front wheel solely through the third supply passageway 16 having the orifice 15. Accordingly, the brake hydraulic pressure of the wheel cylinder 3 gradually rises. This is the slow pressurization mode. If the right front wheel is still about to skid even in the slow pressurization mode, the solenoid of the first passage selector valve 10 is energized to change over this selector valve, and the first pressure-compensated flow control valve 13 is changed over to the ordinary state. As a result, the output port 2a and the wheel cylinder 3 are cut off from each other, the passageway of the brake fluid is changed over and the first supply passageway 8 is opened so as to communicate the wheel cylinder 3 with the reservoir tank 12. Consequently, the brake fluid inside the wheel cylinder 3 rapidly flows out to the reservoir 12, as a result of which the brake hydraulic pressure of wheel cylinder 3 rapidly declines. This is the fast depressurization mode, in which the brake pressure acting upon the right front wheel decreases at a rapid rate. When the brake hydraulic pressure of the wheel cylinder 3 diminishes by a predetermined amount, the first pressure-compensated flow control valve 13 changes over again to shut the first supply passageway 8. Accordingly, the brake fluid inside the wheel cylinder 3 gradually flows out to the reservoir tank 12, as a result of which the brake hydraulic pressure of the wheel cylinder 3 gradually declines. This is the slow depressurization mode, in which the brake pressure acting upon the right front wheel diminishes in gradual fashion.

When the right front wheel is no longer in danger of skidding, the solenoids of both valves 10, 13 are turned off to communicate the output port 2a and wheel cylinder 3, and the passageway of the brake fluid is changed over so as to cut off the wheel cylinder 3 and reservoir tank 12 from each other, and the first supply passageway 8 is opened. As a result, the brake hydraulic pressure of the wheel cylinder 3 rises at a rapid rate to establish the fast pressurization mode, in which the braking force acting upon the right front wheel rapidly increases.

Thus, brake hydraulic pressure is controlled so as to eliminate skidding and make braking distance as short as possible. The control characteristic in this case is shown in FIG. 6.

Antiskid control is performed in a similar manner also when the other wheels are about to skid.

With this antiskid brake control system, however, control is carried out in the four modes shown in Table 1, and hence there is a transition from a pressurizing mode directly to a depressurizing mode or from a depressurizing mode directly to a pressurizing mode. Consequently, when there is a transition from one mode to another, there is a large fluctuation in G (the rate of the adjustment) as well as a large fluctuation in the braking hydraulic pressure. This results in a large amount of brake-pedal kickback as well as a deterioration in riding comfort and driving feeling.

In addition, if it is attempted to minimize the fluctuation in the braking hydraulic pressure, the flow passage selector valve 10 and the first pressure compensated flow control valve 13 must be finely controlled, and therefore the number of times these valves are actuated increases. As a consequence, the flow passage selector valve and first pressure-compensated flow control valve must be highly durable. This results in higher cost.

SUMMARY OF THE INVENTION

An object of the present invention is to provide an antiskid brake control system capable of performing antiskid control in such a manner that a fluctuation in G (the rate of the adjustment) can be made as small as possible.

Another object of the present invention is to provide an antiskid brake control system so adapted as to minimize the number of times flow passage selector valves and pressure-compensated flow control valves are actuated, thereby making it possible for these valves to be fabricated inexpensively.

According to the present invention, the foregoing objects are attained by providing an antiskid brake control system for an automotive vehicle characterized by comprising a first supply passageway for communicating brake hydraulic pressure generating means and a wheel cylinder which generates a braking force applied; a wheel of the vehicle, a flow passage selector valve provided in the first supply passageway for bleeding brake fluid, which has been supplied to the wheel cylinder; to a reservoir tank upon being actuated when the wheel is detected about to skid at the time of braking; a pressure-compensated flow control valve provided in the first supply passageway at a point between the flow passage selector valve and the wheel cylinder for shutting the first supply passageway only when a predetermined control mode prevails in antiskid brake control and opening the first supply passageway at all other times; a second supply passageway having an orifice provided in parallel with the pressure-compensated flow control valve for bypassing the pressure-compensated flow control valve; and a check valve arranged in the second supply passageway.

Still other objects and advantages of the invention will in part be obvious and will in part be apparent from the specification. The invention accordingly comprises the features of construction, combinations of elements and arrangement of parts which will be exemplified in the construction thereinafter set forth, and the scope of the invention will be indicated in the claims.

DESCRIPTION OF THE PREFERRED EMBODIMENTS

In the antiskid brake control system according to the present invention constructed, such as described above, the check valve is provided in the second supply passageway, which bypasses the pressure-compensated flow control valve, and is arranged in series with the orifice. Accordingly, either the slow depressurization mode or slow pressurization mode, in which braking hydraulic pressure is slowly decreased or slowly increased during antiskid braking control, is set in a holding mode, in which braking hydraulic pressure is maintained. By establishing the holding mode when there is a transition from the fast depressurization mode to the fast pressurization mode or from the fast pressurization mode to the fast depressurization mode, a sudden fluctuation in braking hydraulic pressure can be suppressed.

By arranging the check valve so that a flow of brake fluid is allowed only in the direction of the wheel cylinder, the slow and fast pressurization modes, the fast depressurization mode and the holding mode are set. By arranging the check valve so that a flow of brake fluid is allowed only in the direction away from the wheel cylinder, the slow and fast depressurization modes, the fast pressurization mode and the holding mode are set.

As will be apparent from the foregoing description, the antiskid brake control system according to the present invention is advantageous in that the holding mode is set when there is a transition from the fast depressurization mode to the fast pressurization mode or from the fast pressurization mode to the fast depressurization mode. This makes it possible to suppress a sudden fluctuation in braking hydraulic pressure to a comparatively low level. Accordingly, there is no large fluctuation in G and therefore riding comfort during braking control is greatly improved. Moreover, since a fluctuation in braking hydraulic pressure can be kept comparatively small, kickback of the brake pedal also can be suppressed and therefore the driving feeling is improved.

In addition, reducing the fluctuation in braking hydraulic force mans that the flow passage selector valve and pressure compensated flow control valve do not need to be as durable as in the past. This makes it possible to manufacture these valves more inexpensively.

Embodiments of the present invention will now be described in detail with reference to the drawings.

Figure 1:
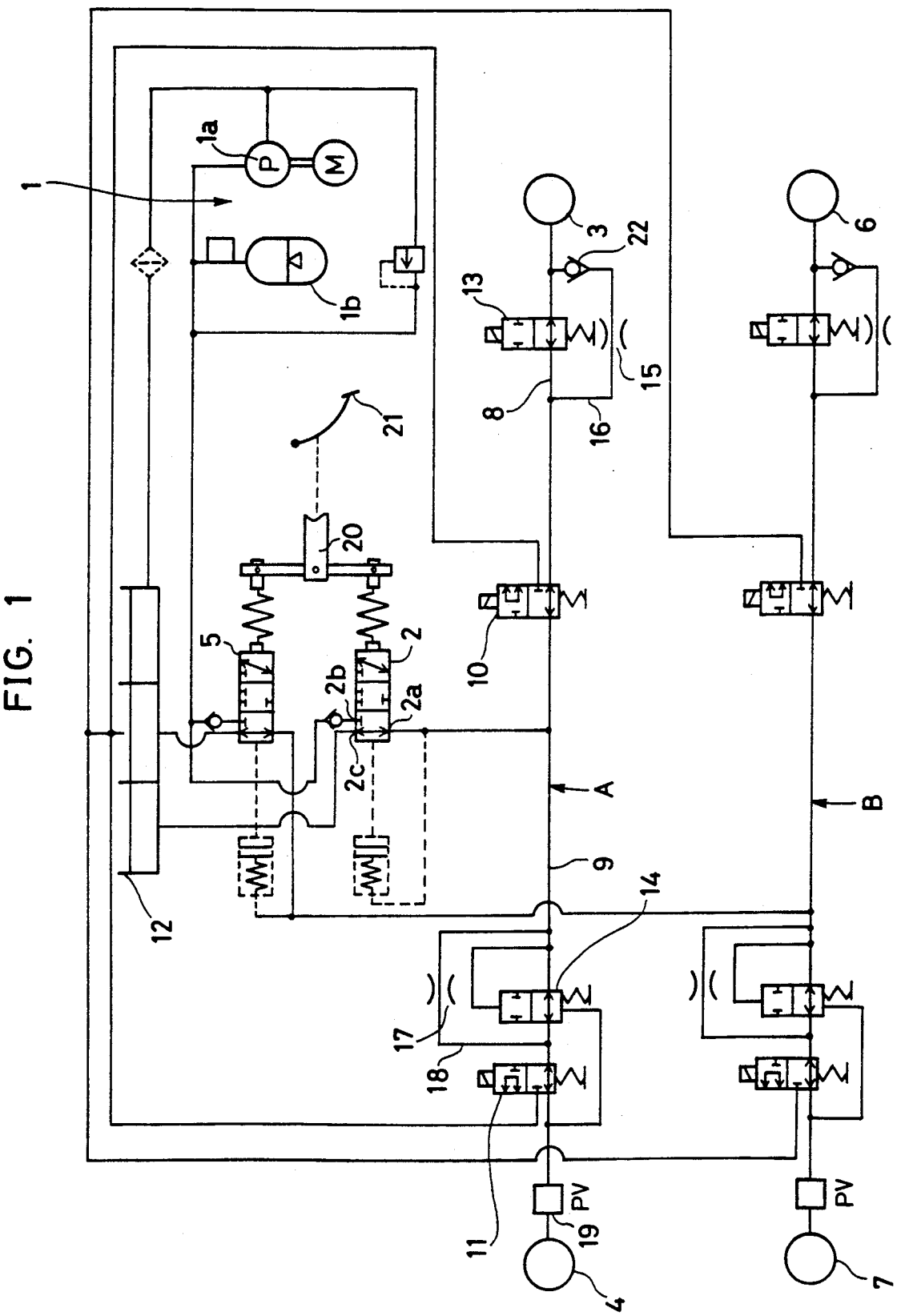
FIG. 1 is a control circuit diagram schematically showing an embodiment of an antiskid brake control system according to the present invention.
Figure 5:
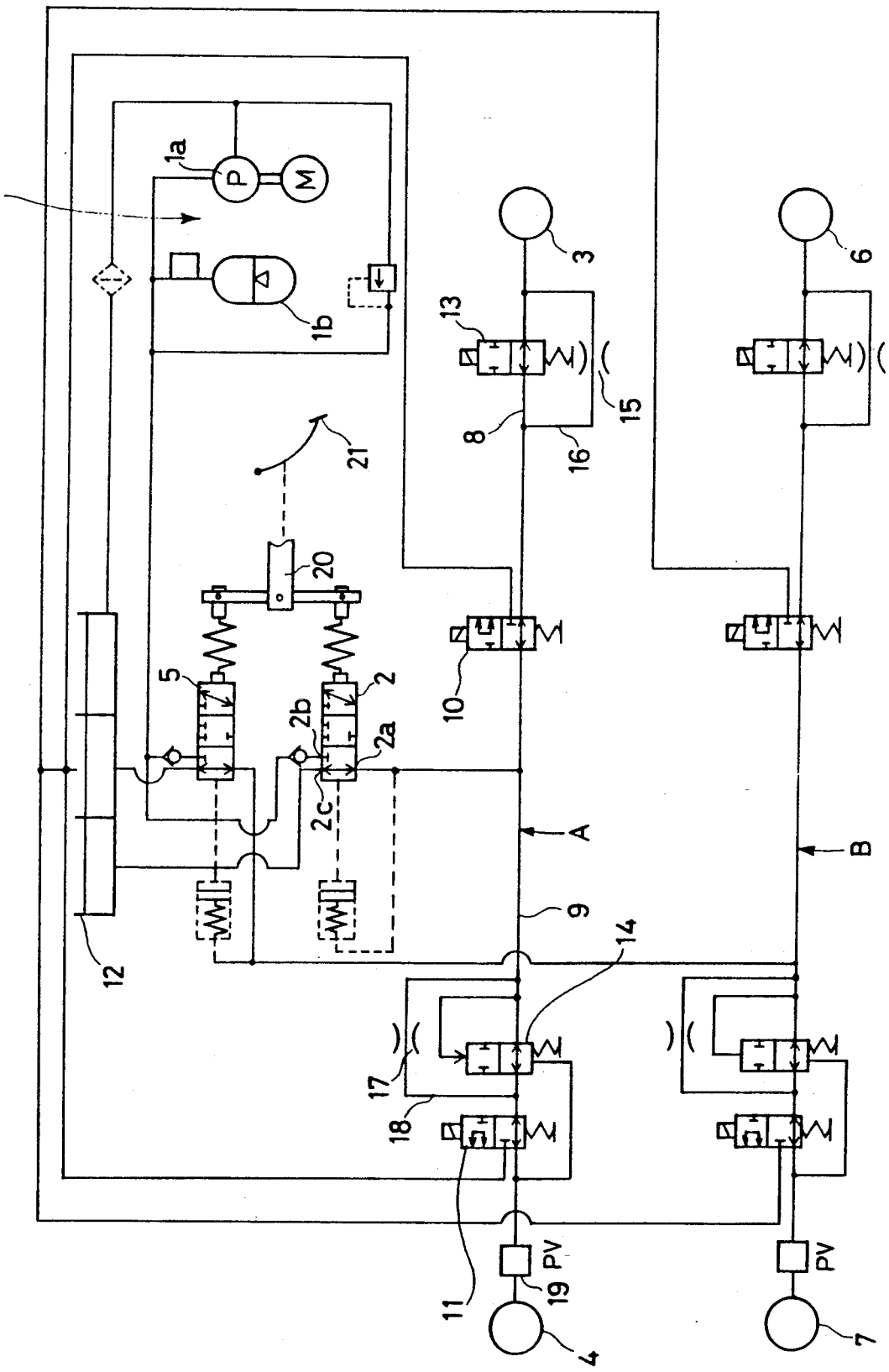
FIG. 5 is a control circuit diagram schematically showing an antiskid brake control system considered as an example.

FIG. 1 is a control circuit diagram, similar to that of FIG. 5, schematically showing an embodiment of an antiskid brake control system according to the present invention. Elements identical with those in the antiskid brake control system of FIG. 5 are designated by like reference characters and a description of these elements is omitted to avoid prolixity. Also, since the first brake system A and second brake system B are identical, just as in FIG. 5, only the first brake system A will be described and not the second brake system B.

As shown in FIG. 1, in this embodiment, the third supply passageway 16 is provided with a check valve 22 which allows flow of the brake fluid only from the upstream side to the downstream side, namely from the output port 2a to the wheel cylinder 3. It is permissible to provide the check valve 22 on either the upstream or downstream side of the orifice 15.

Depending upon the operating states of the first flow passage selector valve 10 and first pressure-compensated flow control valve 13, the antiskid brake control system of this embodiment is set to the control modes shown in Table 2.

TABLE 2

| ANTISKID BRAKE CONTROL MODES | | | |
|---|---|---|---|
| | | FLOW PASSAGE SELECTOR VALVE 10 | |
| | | ON | OFF |
| PRESSURE-COMPENSATED FLOW CONTROL VALVE 13 | ON | HOLDING | SLOW PRESSURIZATION |
| | OFF | FAST DEPRESSURIZATION | FAST PRESSURIZATION |

Accordingly, in this embodiment, a holding mode is set instead of the slow depressurization mode among the control modes in the antiskid brake control system of the kind shown in FIG. 5.

Figure 2:
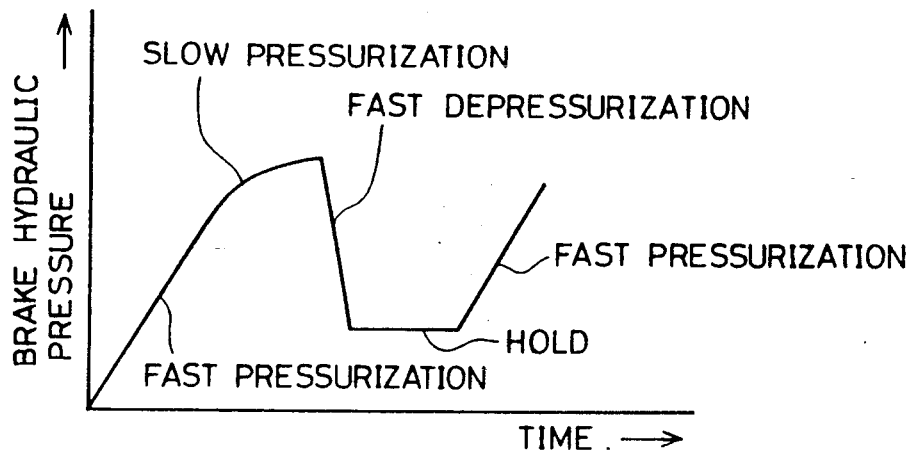
FIG. 2 is a diagram showing the control characteristic in this embodiment.

The operation of this embodiment is the same as that of the antiskid brake control system of FIG. 5 except for the fact that the holding mode is established instead of the slow depressurization mode. Therefore, the similar aspects of this operation need not be described again. In addition, the control characteristic of this embodiment is such that when there is a transition from the fast depressurization mode to the fast pressurization mode, the holding mode is established, as depicted in FIG. 2. As a result, braking hydraulic pressure does not fluctuate as suddenly as in the prior art.

Figure 3:
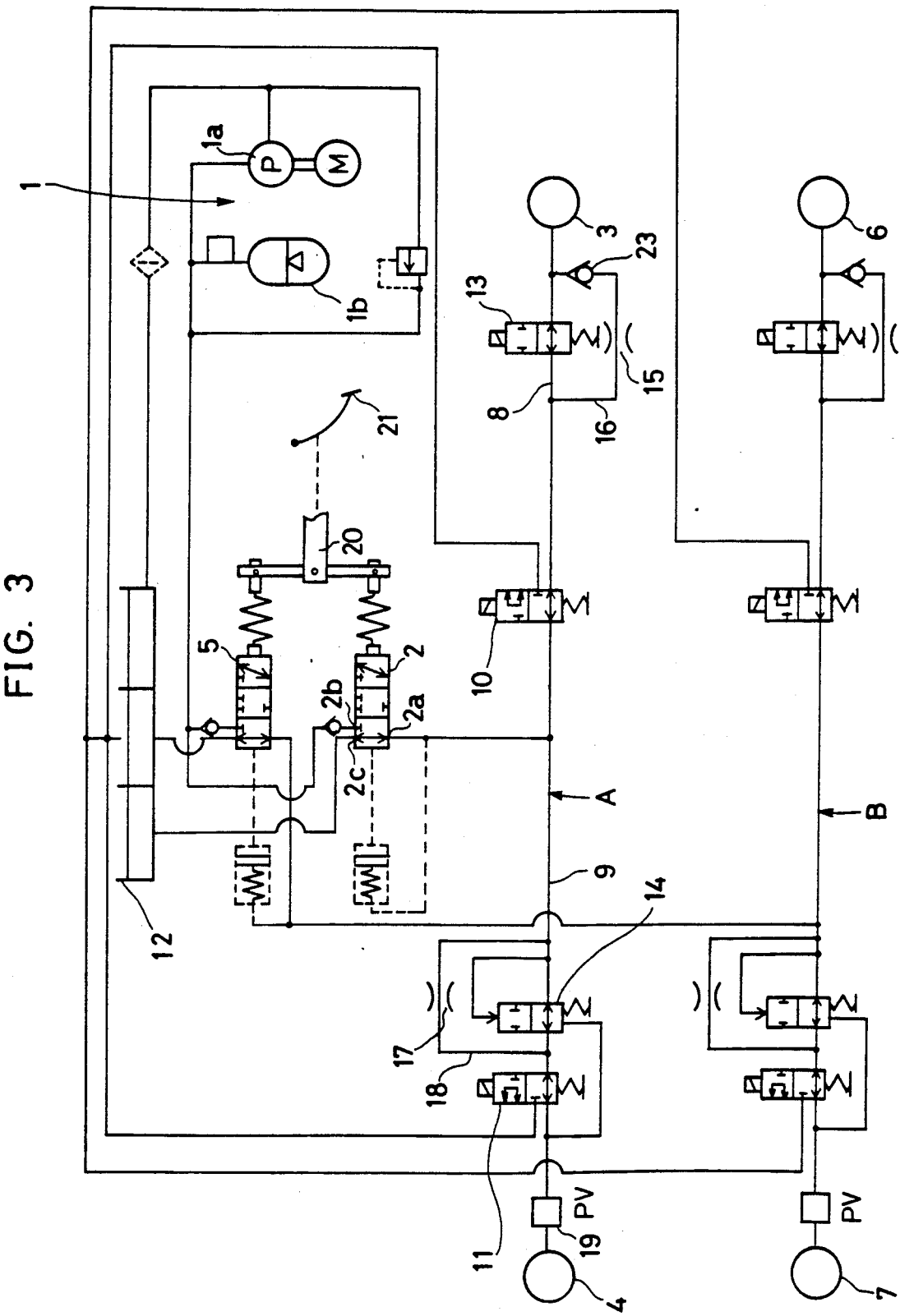
FIG. 3 is a control circuit diagram schematically showing another embodiment of an antiskid brake control system according to the present invention.

FIG. 3 is a control circuit diagram, similar to that of FIG. 5, schematically showing another embodiment of an antiskid brake control system according to the present invention. Elements identical with those in the antiskid brake control system of FIG. 5 are designated by like reference characters and a description of these elements is deleted to avoid prolixity. Also, since the first brake system A and second brake system B are identical, just as in FIG. 5, only the first brake system A will be described and not the second brake system B.

As shown in FIG. 3, in this embodiment, the third supply passageway 16 is provided with a check valve 23 which allows flow of the brake fluid only from the downstream side to the upstream side, namely from the wheel cylinder 3 to the output port 2a. It is permissible to provide the check valve 23 on either the upstream or downstream side of the orifice 15.

Depending upon the operating states of the first flow passage selector valve 10 and first pressure-compensated flow control valve 13, the antiskid brake control system of this embodiment is set to the control modes shown in Table 3.

TABLE 3

| ANTISKID BRAKE CONTROL MODES | | | |
|---|---|---|---|
| | | FLOW PASSAGE SELECTOR VALUE 10 | |
| | | ON | OFF |
| PRESSURE-COMPENSATED FLOW CONTROL VALVE 13 | ON | SLOW DEPRESSURIZATION | HOLDING |
| | OFF | FAST DEPRESSURIZATION | FAST PRESSURIZATION |

Accordingly, in this embodiment, the holding mode is set instead of the slow pressurization mode among the control modes in the antiskid brake control system of the kind shown in FIG. 5.

Figure 4:
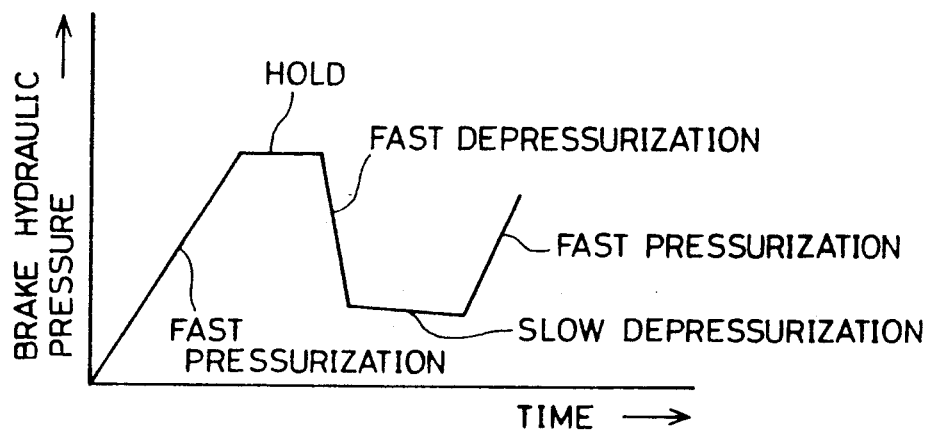
FIG. 4 is a diagram showing the control characteristic in this embodiment.
Figure 6:
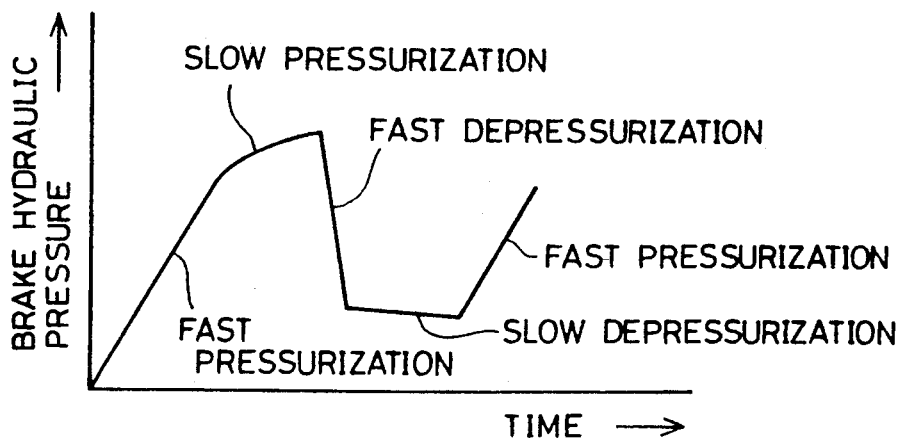
FIG. 6 is a diagram showing the control characteristic in this control circuit.

The operation of this embodiment is the same as that of the antiskid brake control system of FIG. 5 except for the fact that the holding mode is established instead of the slow pressurization mode. Therefore, the similar aspects of this operation need not be described again. In addition, the control characteristic of this embodiment is such that when there is a transition from the fast pressurization mode to the fast depressurization mode, the holding mode is established, as depicted in FIG. 4. As a result, braking hydraulic pressure does not fluctuate as suddenly as in the prior art.

Thus, in either of the two embodiments described above, a sudden fluctuation in brake hydraulic pressure is eliminated by establishing the holding mode, in which the braking hydraulic pressure is maintained, when there is a transition from fast depressurization to fast pressurization or from fast pressurization to fast depressurization. As a result, G does not undergo a large fluctuation and the brake pedal does not develop a large amount of kickback. Accordingly, an excellent riding comfort and driving feeling can be obtained even during antiskid braking control.

The present invention is not limited to the foregoing embodiments but can be modified in various ways. For example, though the holding mode is established only one time in both of the foregoing embodiments, a suitable number of the slow and fast depressurization modes, slow and fast pressurization modes and holding mode can be combined. By adopting such an arrangement, more appropriate antiskid control can be performed.

Though the check valves 22, 23 are provided only in the brake system on front-wheel side in the foregoing embodiments, these check valves can be provided in the rear-wheel brake system or in both the front and rear-wheel brake systems.

Furthermore, though the brake piping is arranged in a diagonal fashion in the foregoing embodiments, the present invention is applicable to other piping arrangements as well. The present invention is applicable not only to the four-channel system of the foregoing embodiments in which the four wheels constituting the front and rear wheels are independent of one another, but also to other channel systems such as a three-channel system in which, say, the left and right front wheels are independent and the rear wheels are independent of the front wheels but not of each other.

Further, though the foregoing embodiments relate to a case where the present invention is applied to dual-system brake circuitry, it goes without saying that the invention is applicable also to single-system brake circuitry.

As many apparently widely different embodiments of the present invention can be made without departing from the spirit and scope thereof, it is to be understood that the invention is not limited to the specific embodiments thereof except as defined in the appended claims.

What is claimed is:

1. An antiskid brake control system for an automotive vehicle comprising:

a supply passageway for communicating brake hydraulic pressure generating means and a wheel cylinder which generates a braking force applied to a wheel of the vehicle;

a flow passage selector valve provided in said supply passageway for bleeding brake fluid, which has been supplied to the wheel cylinder, to a reservoir tank upon being actuated when the wheel is detected about to skid at the time of braking;

a pressure-compensated flow control valve provided in said supply passageway at a point between said flow passage selector valve and the wheel cylinder for shutting said supply passageway only when a slow mode and a holding mode prevails in antiskid brake control and opening said supply passageway at all other times;

a bypass supply passageway having a check valve arranged therein and an orifice arranged in parallel with said pressure-compensated flow control valve for limiting flow rate, said bypass supply passageway only having first and second ends and permitting direct flow of brake fluid between said supply passageway and said wheel cylinder around said pressure-compensated flow control valve, said first end being solely connected to said supply passageway at a point between said flow passage selector valve and said pressure-compensated flow control valve, and said second end being solely connected to said supply passageway at a point between said pressure-compensated flow control valve and said wheel cylinder.

2. The system according to claim 1, wherein said check valve is so arranged as to allow flow of brake fluid only toward the wheel cylinder, and said slow mode is a slow pressurization mode, said flow passage selector valve permitting flow of brake fluid to said bypass supply passageway during said slow pressurization mode and blocking flow of brake fluid to said bypass supply passageway during said holding mode.

3. The system according to claim 1, wherein said check valve is so arranged as to allow flow of brake fluid only away from the wheel cylinder, and said slow mode is a slow depressurization mode, said flow passage selector valve permitting flow of brake fluid from said bypass supply passageway during said slow depressurization mode and blocking flow of brake fluid from said bypass supply passageway during said holding mode.

* * * * *